(12) United States Patent
Suzuki et al.

(10) Patent No.: US 9,268,115 B2
(45) Date of Patent: Feb. 23, 2016

(54) IMAGING LENS

(75) Inventors: Hisanori Suzuki, Sukagawa (JP); Kazuo Matsuoka, Saitama (JP)

(73) Assignee: KANTATSU CO., LTD., Yaita-shi (JP)

( * ) Notice: Subject to any disclaimer, the term of this patent is extended or adjusted under 35 U.S.C. 154(b) by 509 days.

(21) Appl. No.: 13/527,747

(22) Filed: Jun. 20, 2012

(65) Prior Publication Data

US 2013/0003194 A1 Jan. 3, 2013

(30) Foreign Application Priority Data

Jun. 30, 2011 (JP) ................................. 2011-146649

(51) Int. Cl.
G02B 3/02 (2006.01)
G02B 9/34 (2006.01)
G02B 13/00 (2006.01)

(52) U.S. Cl.
CPC ..................................... G02B 13/004 (2013.01)

(58) Field of Classification Search
USPC ................... 359/715, 771, 772, 773
See application file for complete search history.

(56) References Cited

U.S. PATENT DOCUMENTS

| 7,453,654 B2 | 11/2008 | Shinohara |
| 7,502,181 B2 | 3/2009 | Shinohara |
| 7,944,627 B2 | 5/2011 | Sakagami |
| 8,194,333 B2 | 6/2012 | Iba et al. |
| 8,451,546 B2 | 5/2013 | Iba et al. |
| 2008/0180816 A1 | 7/2008 | Nakamura |
| 2010/0214467 A1 | 8/2010 | Ohtsu |
| 2011/0261471 A1* | 10/2011 | Taniyama ..................... 359/715 |

FOREIGN PATENT DOCUMENTS

| JP | 2007-212877 A | 8/2007 |
| JP | 2007-219079 A | 8/2007 |
| JP | 2007-264180 A | 10/2007 |
| JP | 2008-185880 A | 8/2008 |
| JP | 2009-069193 A | 4/2009 |
| JP | 2010-060834 A | 3/2010 |
| JP | 2010-197665 A | 9/2010 |
| JP | 2011-107631 A | 6/2011 |
| WO | 2009/101721 A1 | 8/2009 |

OTHER PUBLICATIONS

Office Action dated Nov. 18, 2014, issued in corresponding Japanese Patent Application No. 2011-146649 (2 pages).

* cited by examiner

*Primary Examiner* — Jack Dinh
(74) *Attorney, Agent, or Firm* — Westerman, Hattori, Daniels & Adrian, LLP

(57) ABSTRACT

To provide a high image-quality, low cost, and small sized imaging lens suitable for an imaging lens which is compact and which has high density pixels, and with aberrations corrected satisfactorily. An imaging lens is configured from a first lens, a second lens, a third lens, and a fourth lens arranged in the named order from an object side, wherein both surfaces of each lens are formed from aspheric surface, and a diffraction optics surface exerting chromatic aberration correction function is arranged on any one surface from a surface of the first lens on an object side to a surface of the third lens on the object side, and each lens is configured from plastic material.

4 Claims, 12 Drawing Sheets

IMAGING LENS

The present application is based on and claims priority of Japanese patent application No. 2011-146649 filed on Jun. 30, 2011, the entire contents of which are hereby incorporated by reference.

BACKGROUND OF THE INVENTION

1. Field of the Invention

The present invention relates to an imaging lens which forms on an imaging element such as a CCD (Charge Coupled Device) sensor or a CMOS (Complementary Metal Oxide Semiconductor) sensor an image of an object, and relates to a small-sized imaging lens to be mounted on a PDA (Personal Digital Assistant) such as a cellular phone and the like.

2. Description of the Related Art

In recent years, camera functions are mounted on almost all cellular phones. Recently, cellular phones with high-resolution camera function comparable with a digital still camera mounted thereon have been introduced. Imaging devices realizing such camera function are being downsized further in accordance with increasing demands for downsizing and slimming cellular phones. Inevitably, imaging lenses fixed to the imaging devices are also subjected to intense demands for downsizing. Further, imaging lenses realizing high optical performance capable of being applied to increasing pixels and increasing resolution of the imaging element are being demanded intensely.

Accompanying the downsizing and increasing pixels of the imaging element, pixel size is miniaturized further and the density thereof is increased. Recently, imaging elements with a pixel pitch of less than 1.4 micron are proposed. As the performance required for the imaging lens corresponding to such imaging element, the simple accomplishment of small aberrations is not enough. This is because bright optical system having sufficient resolution, that is, imaging lens with larger aperture ratio, is demanded intensely. Conventionally, imaging lens having a three-lens configuration has been widely proposed. However, imaging lens having four-lens configuration and five-lens configuration are also being proposed, so as to be adopted in above-described imaging elements.

For example, the imaging lens according to Japanese Patent Application Laid-Open No. 2007-219079 (Patent document 1) comprises, in order from an object side, a positive first lens with a surface on the object side having a convex shape, a negative meniscus second lens with a concave surface facing an image side, a positive meniscus third lens with a convex surface facing the image side, and a positive or a negative fourth lens with both surface formed from aspheric surface and with a surface on the image side having concave shape in the vicinity of an optical axis. In such configuration, by setting the Abbe number of the first lens and the second lens to a preferable range, it becomes possible to obtain the correction effect of an axial chromatic aberration and a chromatic aberration of magnification, and by setting a ratio of a focal length of the second lens and the first lens and a ratio of a focal length between the third lens and the fourth lens, it becomes possible to secure telecentric properties and to correct the axial chromatic aberration and the chromatic aberration of magnification, while downsizing the overall lens system. Further, the imaging lens according to Japanese Patent Application Laid-Open No. 2007-264180 (Patent document 2) and Japanese Patent Application Laid-Open No. 2010-197665 (Patent document 3) propose practical lens solving the problems of the four-lens configuration, by utilizing the five-lens configuration.

According to Patent document 1, it becomes possible to obtain comparatively favorable aberration. However, in order to obtain sufficient resolution while corresponding to the small-sized, high-density imaging element as is explained above, a large aperture ratio such as F/2.4 is required. In Patent document 1, the total track length (TTL) is long, so that it is not suitable for downsizing. Further, it is difficult to realize favorable aberration correction while securing large aperture ratio. Patent document 2 and Patent document 3 propose practical lenses by solving the problems of the four-lens configuration, however, it is disadvantageous in cutting down costs since a large number of lenses must be used to configure the imaging lens. Further, since a large number of lenses sensible to manufacturing tolerance is used, it is disadvantageous also from the viewpoint of manufacturing cost. Also, since glass material is heavily used, it is disadvantageous from the viewpoint of reducing cost. Further, in Patent document 2 and Patent document 3, when plastic material is selected for decreasing cost, since the applicable lens material is extremely limited, it is difficult to achieve both correction of chromatic aberration and correction of other various aberrations.

SUMMARY OF THE INVENTION

In view of the problems of the prior art explained above, the present invention aims at providing an imaging lens which is small-sized, capable of correcting chromatic aberration effectively, is capable of satisfactorily correcting other various aberrations, which has large aperture ratio, and has high performance, while corresponding to the slimming of recent cellular phones.

In order to solve the problem mentioned above, the present invention provides an imaging lens for an imaging element, comprising a first lens, a second lens, a third lens, and a fourth lens arranged in the named order from an object side, wherein both surfaces of each lens are formed of aspheric surfaces, a diffraction optics surface exerting chromatic aberration correction function is arranged on any one surface from a surface of the first lens on an object side to a surface of the third lens on the object side, and each lens is configured from plastic material.

With such configuration, various aberrations are satisfactorily corrected, and by forming the diffraction optics surface at the optimum surface, satisfactory correction of the chromatic aberration is realized.

The diffraction optics surface is configured from a relief for generating an optical path difference defined by an optical path difference function. Normally, Abbe number of glass material is 25 to 80 at the e-ray, the Abbe number of the e-ray of the diffraction optics surface is approximately −3.3, and has a property of indicating roughly one digit larger diffraction with reversed sign. In the case of correcting the chromatic aberration, it is well-known to configure the lens by combining at least two materials having different dispersion. However, it becomes possible to realize correction of the chromatic aberration more effectively, by forming the diffraction optics surface on an appropriate surface.

In the general lens system not using the diffraction optics surface, generally a lens formed of a high dispersive material for correction of the chromatic aberration is arranged at a position close to an aperture diaphragm. Similarly, by arranging the diffraction optics surface at a position close to the aperture diaphragm, it is effective in correcting the chromatic aberration for both axial and extra-axial.

In the present invention, the diffraction optics surface is formed on any one surface of the surface of the first lens on the object side to the surface of the third lens on the object side.

In the lens configuration of the present invention, in order to obtain the correction effect of the chromatic aberration, the refractive power of the second lens is made negative, and also a material with high dispersion is adopted. However, there is a limitation to the correction effect only by combining materials, and chromatic aberration inevitably remains. Therefore, in the present invention, in order to effectively reduce the remaining chromatic aberration, the diffraction optics surface is formed at the optimum position in the lens system, in order to enable favorable correction of both axial and extra-axial chromatic aberration.

Further, in the present invention, in order to facilitate manufacturing and reduce costs, all lenses are configured from plastic material. As is well-known, there is a limitation to the selectable plastic material in the optical system. That is, it is not possible to demand high refractive index and low dispersivity characteristics, such as in a glass material, to the plastic material. Conventionally, in the case where all of the lenses are made of plastic material, it had been difficult to simultaneously correct all the various aberrations, field curvature, and chromatic aberration. In the present invention, by the diffraction optics surface preferably operating the correction of the chromatic aberration, it becomes possible to easily correct the various aberrations other than the chromatic aberration. Therefore, even when the plastic material is adopted to all the lenses, it becomes possible to realize low-cost imaging lens with the aberrations corrected favorably.

In the imaging lens having the above-mentioned configuration, the first lens is the biconvex lens, the second lens is the biconcave lens, the third lens is the meniscus lens having the positive refractive power facing the concave surface to the object side, the fourth lens is the biconcave lens, and the aperture diaphragm is arranged on the surface of the first lens on the object side.

Explanation will be given on the effect of making the first lens the biconvex lens. The third lens and the fourth lens are positioned close to the imaging surface, so that a transiting region of rays imaging on the optical axis is narrow, and the involvement of the lenses to the axial chromatic aberration correction is small. Therefore, the correction of the axial chromatic aberration is performed by the first lens and the second lens, so that the refractive power of the first lens must be set strong. In order to suppress the generation of the spherical aberration by the first lens and the sensitivity to tolerance low, and correct other aberrations in a balanced manner, it is effective to form the first lens in a biconvex shape.

Further, the second lens is a biconcave lens, which plays an important role in correction of the astigmatic aberration and the coma aberration, simultaneously as realizing the chromatic aberration correction. The surface of the second lens on the object side preferably has a larger radius of curvature than the surface on the image side. Such arrangement enables to effectively correct the chromatic aberration of magnification and the various extra-axial aberrations. However, with respect to larger aperture ratio, broader field of view, and shortening of the total track length, the extra-axial aberrations tends to degrade when the surface of the second lens on the object side is set to have larger radius of curvature than the surface on the image side. Further, if the negative refractive power of the surface of the second lens on the image side becomes too strong, the sensitivity to tolerance tends to become severe. The present invention solves these problems by forming the diffraction optics surface at an appropriate position.

Further, by designing the third lens as a meniscus lens having positive refractive power with the surface on the object side being concave surface, and the fourth lens as a biconcave lens having negative refractive power, the shortening of the total track length is achieved and the various aberrations related to extra-axial ray are satisfactorily corrected. By designing the third lens as a meniscus lens having positive refractive power with the concave surface facing the object side, it becomes possible to suppress increase of the total track length while maintaining appropriate back focus. Further, by designing the fourth lens as a lens having a biconcave shape, decrease of the distortion and the telecentric property of the angle of chief ray entering the imaging element are secured.

Moreover, by arranging the aperture diaphragm on the surface of the first lens on the object side, it becomes possible to control the incident angle of the chief ray entering the imaging element to be within a given range.

Further, the imaging lens of the above-mentioned configuration satisfies following condition equations:

$$0.83 < f/f_{12} < 1.04 \quad (1)$$

$$-0.05 < f/f_{34} < 0.08 \quad (2)$$

$$-0.07 < f/(V_2 f_2) + f/(V_d f_d) < -0.03 \quad (3)$$

$$-0.01 < f/f_d < 0.15 \quad (4)$$

where
f: focal length of overall optical system
$f_{12}$: composite focal length of the first lens and the second lens
$f_{34}$: composite focal length of the third lens and the fourth lens
$f_2$: focal length of the second lens
$f_d$: focal length of the diffraction optics surface
$V_2$: the Abbe number of the e-ray of the second lens material
$V_d$: the Abbe number of the e-ray of the diffraction optics surface The condition equation (1) is a condition for correcting the axial chromatic aberration, by suppressing generation of the spherical aberration by making the composite refractive power of the first lens and the second lens to a value close to the refractive power of the overall optical system. If the value drops below the lower limit value of "0.83" of the condition equation (1), it is advantageous for correction of various aberrations, increase of aperture ratio, and broadening of angle of field, but it becomes difficult to downsize because the total track length becomes long. On the other hand, if the value exceeds the upper limit value of "1.04", the composite refractive power of the first lens and the second lens becomes too strong, making it difficult to correct various aberrations, increase aperture ratio, and broaden angle of field.

The condition equation (2) is for facilitating shortening of the total track length, securing appropriate back focus, correcting distortion, and controlling the incident angle of chief ray entering the imaging element, by controlling the composite refractive power of the third lens and the fourth lens to a value close to zero. If the value drops below the lower limit value of "−0.05" of the condition equation (2), it is advantageous for shortening the total track length, but it becomes difficult to correct aberrations, since the distortion becomes larger in the positive direction and the incident angle of the chief ray becomes large. On the other hand, if the value exceeds the upper limit value of "0.08", the total track length becomes longer and it becomes difficult to secure back focus.

The condition equation (3) is a condition for defining the relationship between the refractive power of the second lens and the refractive power near the axis of the diffraction optics surface, and for realizing optimum chromatic aberration correction. If the value drops below the lower limit value of "−0.07" of the condition equation (3), the refractive power of the second lens and the diffraction optics surface for correcting the chromatic aberration becomes excessive, and it becomes difficult to correct the chromatic aberration. On the other hand, if the value exceeds the upper limit value of "−0.03", the refractive power conversely runs short, and it also becomes difficult to correct the chromatic aberration.

It is known that the chromatic aberration correction in the two thin lenses is given by the following equation.

$$V_1 \cdot f_1 = -V_2 \cdot f_2$$

where
$V_1$: the Abbe number of the first lens
$f_1$: the focal length of the first lens
$V_2$: the Abbe number of the second lens
$f_2$: the focal length of the second lens For example, when it is set that the focal length of the overall optical system is 1.0, $V_1=56.7$, and $V_2=26.0$, then $f_1=0.5414$, $f_2=-1.1808$, and $1/(V_2 \cdot f_2)=-0.033$ are easily obtained. Similarly, when $V_2=-3.326$ is given for the second lens as the diffraction optics surface, then $f_1=1.0588$, $f_2=18.01$, and $1/(V_2 \cdot f_2)=-0.017$ are obtained. The position of the second lens in the present invention is arranged to a distance optimally away from the aperture diaphragm. In this case, the value of the condition equation (3) becomes an absolute value larger than the value of the two thin lenses mentioned above. However, by combining with the diffraction optics surface, this value may be changed. In the present invention, the diffraction optics surface positioned farthest from the aperture diaphragm is the surface on the object side of the third lens. The region of this surface where the rays pass is approximately 50% of the ray region passing the aperture diaphragm, since ray is condensed by the lens. In such case, in order to enable the chromatic aberration correction to the same extent as the two thin lenses mentioned above, the value of "−0.07" of the condition equation (3) becomes the lower limit.

The condition equation (4) is for defining the range of the refractive power near the axis of the diffraction optics surface, and it is a condition, in cooperation with the condition equation (3), for achieving favorable chromatic aberration correction. If the value drops below the lower limit value of "−0.01" of the condition equation (4), the burden of the axial chromatic aberration correction of the second lens becomes large, and it becomes difficult to correct aberration. On the other hand, if the value exceeds the upper limit value of "0.15", the axial chromatic aberration correction becomes excessive, that is, the short-wavelength with respect to the standard wavelength increases in the positive direction, so that the balance between the axial chromatic aberration and the chromatic aberration of magnification becomes off-balanced, and it becomes difficult to correct the chromatic aberration favorably.

The refractive power near the axis of the diffraction optics surface does not necessarily directly represent the state of the actual chromatic aberration correction, since the optical path difference function is defined by a high-degree equation. However, there is a constant tendency between the position where the diffraction optical element is installed and the refractive power near the axis. That is, in the case where the diffraction optics surface is arranged at the side close to the object side, the refractive power near the axis becomes large mainly for axial chromatic aberration correction. In contrast thereto, in the case where the diffraction optics surface is arranged at the surface far from the object side, it becomes necessary mainly to correct the chromatic aberration of magnification, so that it is not necessary to increase the refractive power near the axis. In the case of the configuration of the third lens and the fourth lens of the present invention, the extra-axial aberration correction amount is large, and the change of the chromatic aberration of magnification becomes large as the effect of the aspheric surface, so that in the diffraction optics surface, the refractive power near the axis takes a comparatively small value, and a high-order term of the optical path difference function takes a large value.

DETAILED DESCRIPTION OF THE PREFERRED EMBODIMENT

Hereinafter, embodiments for realizing the present invention will be explained in detail with reference to the accompanying drawings.

FIG. 1, FIG. 3, FIG. 5, FIG. 7, FIG. 9, and FIG. 11 respectively show a lens cross-sectional view corresponding to embodiments 1 through 6 of the present invention. The basic lens configuration is the same in all embodiments, so that explanation will be given on the lens configuration of the imaging lens according to the present embodiments, with reference to the cross-sectional view of the lens according to embodiment 1.

Figure 1:
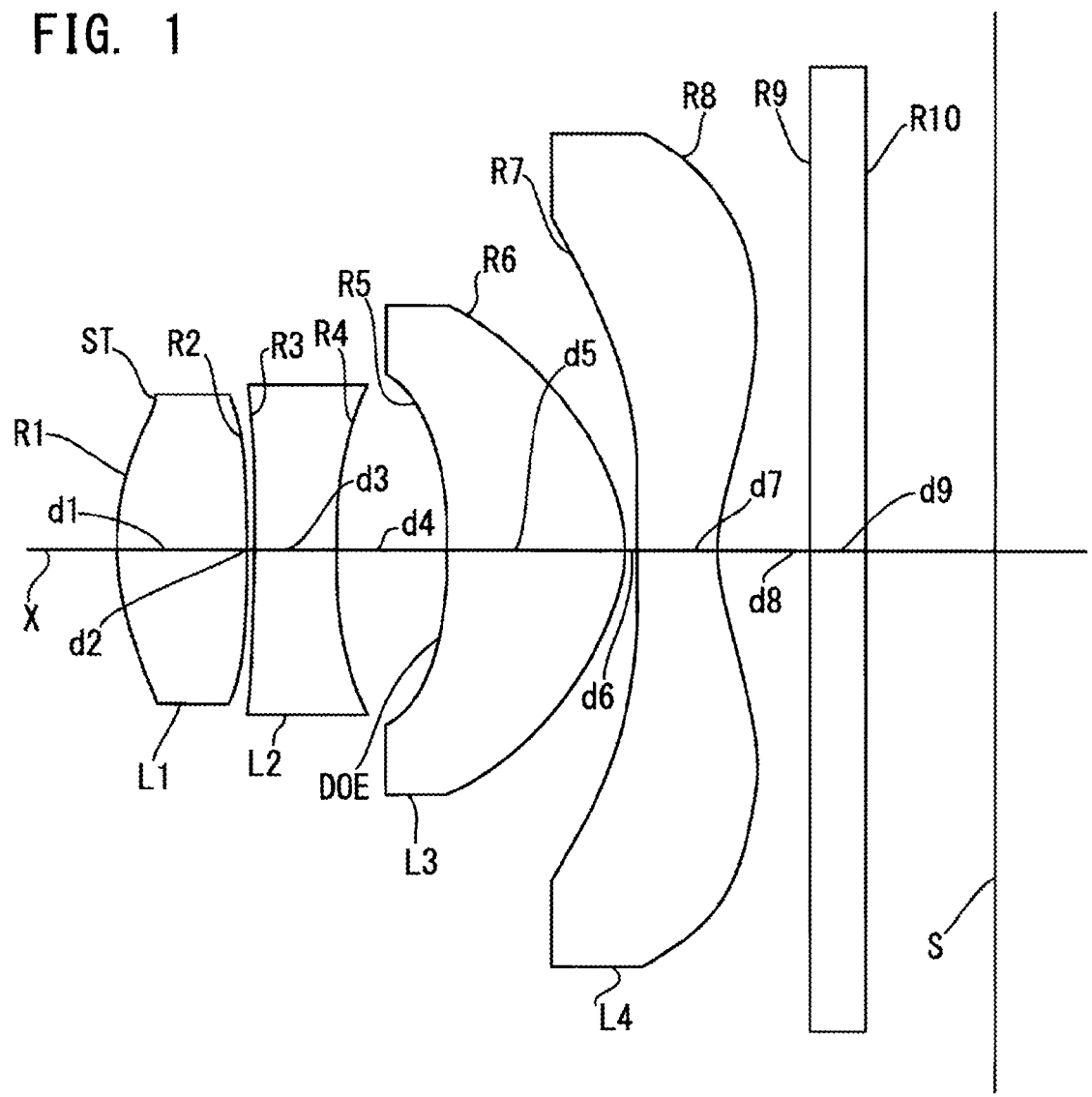
FIG. 1 is a cross-sectional view of the imaging lens related to embodiment 1 of the present invention.

As shown in FIG. 1, the imaging lens of the present invention is configured from a first lens L1 of a biconvex lens, a second lens L2 of a biconcave lens, a third lens L3 of a meniscus lens having a positive refractive power with a concave surface facing an object side, and a fourth lens L4 of the biconcave lens. Further, both surfaces of all lenses are configured from aspheric surfaces, and all lenses are configured from a plastic material.

In all the embodiments, a rim of the effective diameter of a surface R1 of the first lens L1 on the object side doubles the effect of an aperture diaphragm ST. Further, cover glass configured from R9 and R10 is arranged between a surface R8 of the fourth lens L4 on the image side and an image-forming surface S. Further, in the cross-sectional view, d1, d2, ..., d9 represent surface intervals, X represents the optical axis, and DOE represents a diffraction optics surface, respectively.

In the present embodiments, all lenses are formed from aspheric surfaces. The aspheric shape adopted to these lens surfaces are, when an axis in an optical axis direction is taken as Z, the height in the direction orthogonal to the optical axis Z as Y, a constant of the cone as K, and an aspheric coefficient as $A_{2i}$, represented by Equation 1.

Further, in any one of the surface R1 of the first lens L1 on the object side to the surface R5 of the third lens L3 on the object side, the diffraction optics surface DOE of an optical path difference function represented by Equation 2 is formed.

$$Z = \frac{\frac{Y^2}{R}}{1+\sqrt{1-(1+K)\times\frac{Y^2}{R^2}}} + \sum_{i=2}^{10} A_{2i} \times Y^{2i} \quad \text{[Equation 1]}$$

$$P = \sum_{i=1}^{n} B_{2i} Y^{2i} \quad \text{[Equation 2]}$$

where

P: optical path difference (unit: wavelength)

$B_{2i}$: coefficient of optical path difference function (i=1 to n)

Next, embodiments of the imaging lens according to the present embodiment will be shown. In each embodiment, f represents the focal length of the overall optical system, Fno represents F number, and ω represents a half angle of view. Further, the surface number indicates the number counted from the object side, R represents a curvature radius, d represents a distance between the lens surfaces along the optical axis (the surface interval), n represents an index of refraction with respect to the e-ray, and v represents the Abbe number with respect to the e-ray.

[Embodiment 1]

The basic lens data is shown in Table 1 below. The diffraction optics surface DOE is formed on the surface R5 of the third lens L3 on the object side.

TABLE 1

Surface data

| Surface No. | R | d | n | v |
|---|---|---|---|---|
| Object surface | ∞ | ∞ | | |
| 1 (diaphragm) | 1.5750 | 0.7000 | 1.53690 | 56.1 |
| 2 | −6.2059 | 0.0394 | | |
| 3 | −9.3660 | 0.4419 | 1.61988 | 25.4 |
| 4 | 3.6306 | 0.6077 | | |
| 5 (DOE) | −2.3470 | 0.9602 | 1.54647 | 55.8 |
| 6 | −0.7420 | 0.0682 | | |
| 7 | −31.0000 | 0.4349 | 1.53690 | 56.1 |
| 8 | 0.8712 | 0.5000 | | |
| 9 | ∞ | 0.3000 | 1.51872 | 64.0 |
| 10 | ∞ | 0.7076 | | |
| Image surface | ∞ | | | | f = 3.905, Fno = 2.4, ω = 36.4°

Next, Table 2 shows the aspheric coefficient and the values of each coefficient of the optical path difference function of the diffraction optics surface in embodiment 1.

TABLE 2

Aspheric surface data

| First surface Aspheric coefficient | Second surface Aspheric coefficient |
|---|---|
| K = −5.0322E+00<br>A4 = 1.5537E−01<br>A6 = −1.3886E−01<br>A8 = 1.5429E−01<br>A10 = −1.5617E−01 | K = 0.0000E+00<br>A4 = 1.5010E−01<br>A6 = −5.1353E−01<br>A8 = 2.7025E−01<br>A10 = 0.0000E+00 |

| Third surface Aspheric coefficient | Fourth surface Aspheric coefficient |
|---|---|
| K = 2.5754E+01<br>A4 = 2.0551E−01<br>A6 = −4.7012E−01<br>A8 = 1.5736E−01<br>A10 = 1.4987E−01<br>A12 = 1.6844E−02 | K = −4.6191E−01<br>A4 = 1.2878E−01<br>A6 = −9.2016E−02<br>A8 = 1.2306E−01<br>A10 = −1.7668E−01<br>A12 = 1.5738E−01 |

| Fifth surface Aspheric coefficient | Sixth surface Aspheric coefficient |
|---|---|
| K = 4.9274E+00<br>A4 = −2.9530E−02<br>A6 = −3.1755E−02<br>A8 = 8.0141E−01<br>A10 = −2.4276E+00<br>A12 = 2.7718E+00<br>A14 = −1.0642E+00<br>A16 = −6.3964E−02 | K = −4.3207E+00<br>A4 = −2.5991E−01<br>A6 = 2.7078E−01<br>A8 = −2.4949E−01<br>A10 = 1.1441E−01<br>A12 = −9.1844E−03<br>A14 = −1.2703E−02<br>A16 = 3.2086E−03 |

| Seventh surface Aspheric coefficient | Eighth surface Aspheric coefficient |
|---|---|
| K = 0.0000E+00<br>A4 = −1.2800E−01<br>A6 = 5.2785E−02<br>A8 = −1.0838E−02<br>A10 = 9.1658E−04 | K = −8.0394E+00<br>A4 = −1.0743E−01<br>A6 = 5.0631E−02<br>A8 = −1.9469E−02<br>A10 = 4.8916E−03<br>A12 = −8.1099E−04<br>A14 = 8.1033E−05<br>A16 = −3.9354E−06 |

| Fifth surface Coefficient of optical path difference function |
|---|
| B2 = 4.6952E−01<br>B4 = −5.5444E+01<br>B6 = 1.1975E+02<br>B8 = 3.1748E+02<br>B10 = −1.5085E+03<br>B12 = 1.9510E+03<br>B14 = −8.4623E+02 |

The values of each condition equations are shown below.

$$f/f_{12}=0.916 \quad (1)$$

$$f/f_{34}=0.055 \quad (2)$$

$$f/(v_2 f_2)+f/(v_d f_d)=-0.036 \quad (3)$$

$$f/f_d=-0.002 \quad (4)$$

As is apparent, the imaging lens according to embodiment 1 satisfies the condition equations (1) through (4).

Figure 2:
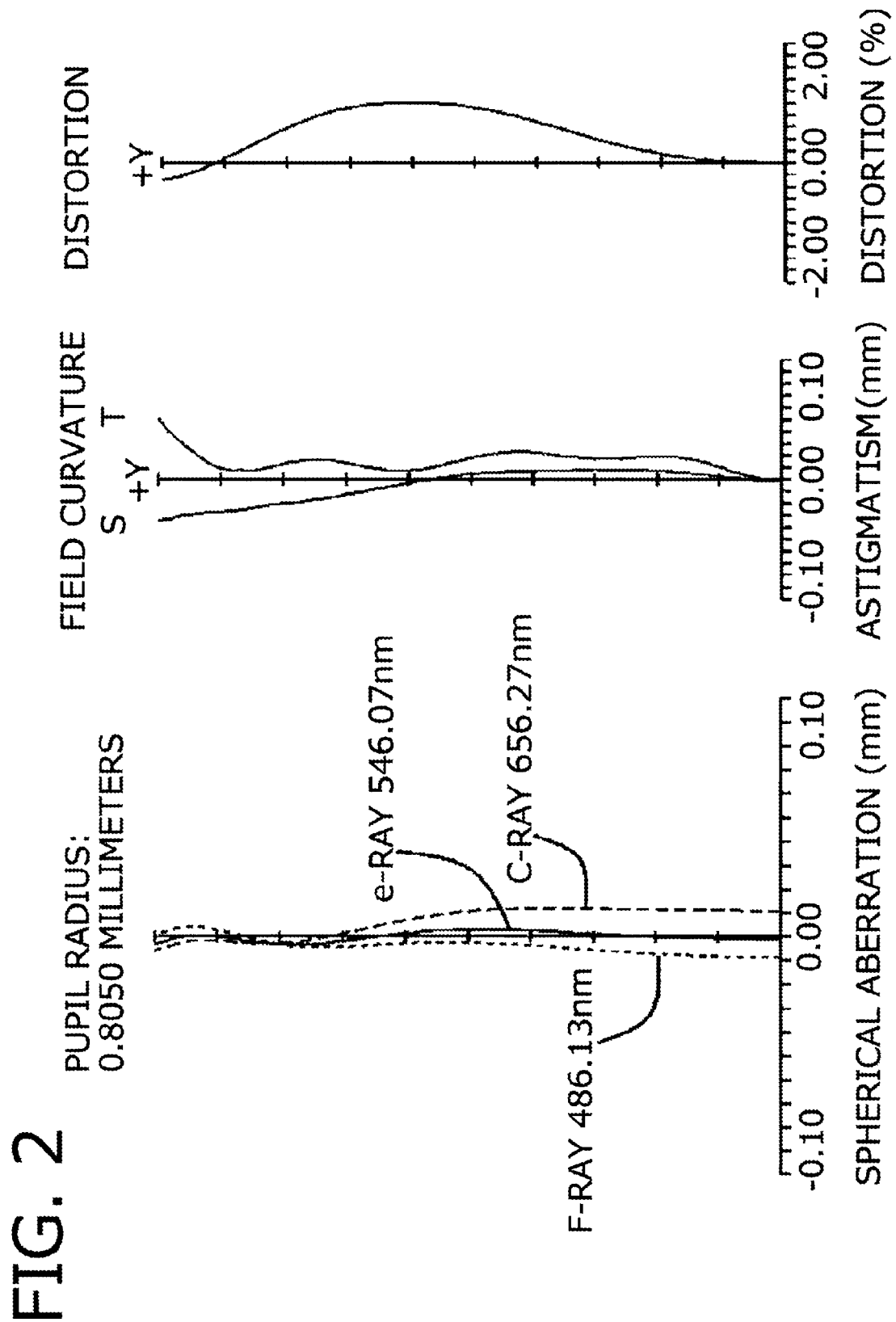
FIG. 2 is an aberration diagram of the imaging lens related to embodiment 1 of the present invention.
Figure 3:
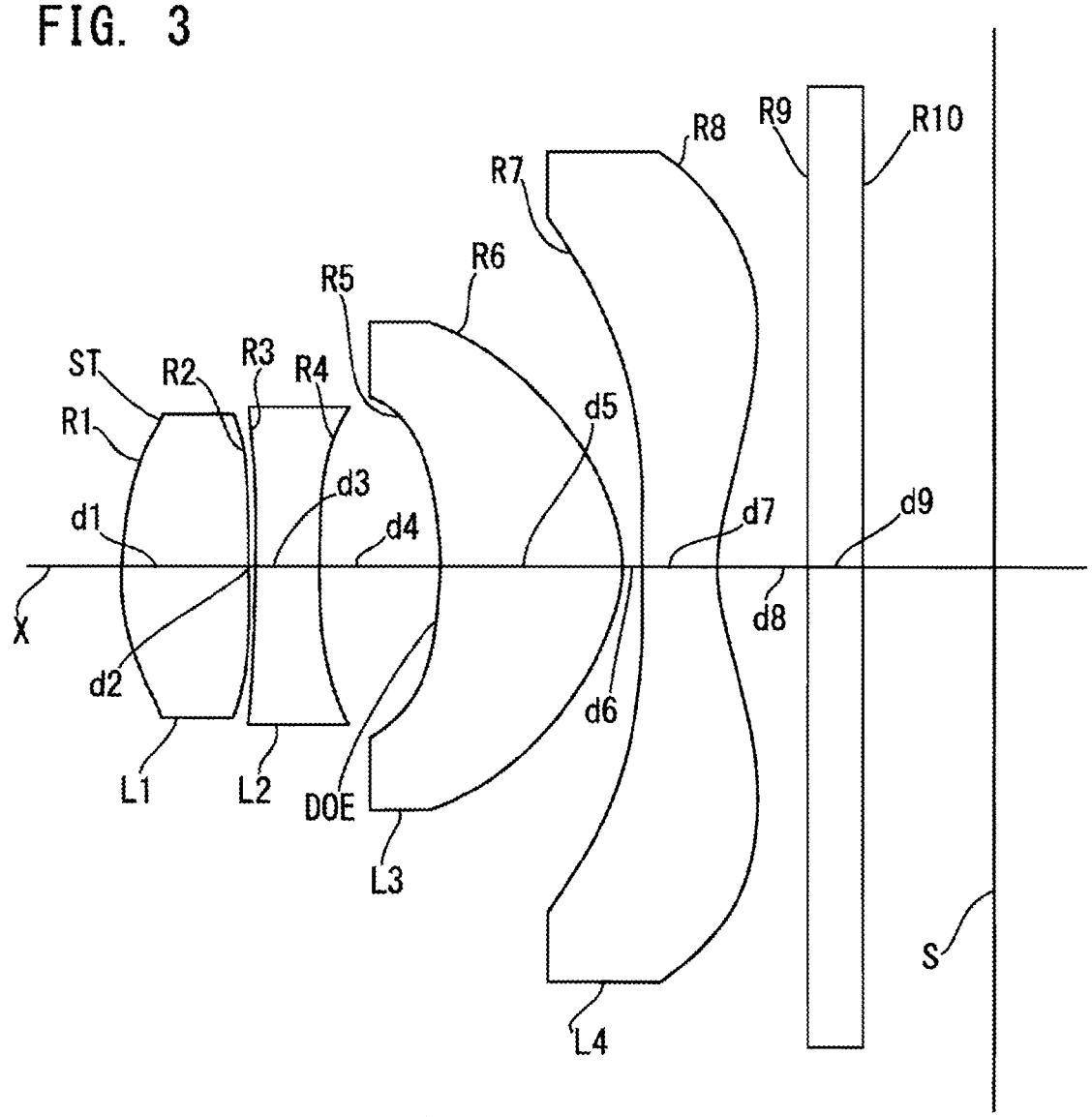
FIG. 3 is a cross-sectional view of the imaging lens related to embodiment 2 of the present invention.

FIG. 2 shows the spherical aberration (mm), astigmatic aberration (mm), and distortion (%) of the imaging lens of embodiment 1. In these aberration diagrams, the spherical aberration diagram shows the aberration amount with respect to each wavelength of F-ray (486.13 nm), e-ray (546.07 nm), and C-ray (656.27 nm), and the astigmatic aberration diagram shows the aberration amount at sagittal image surface S and the aberration amount at the meridional image surface T (the same applies to FIGS. 4, 6, 8, 10, and 12).

As shown in FIG. 2, according to the imaging lens related to embodiment 1, chromatic aberration is corrected satisfactorily, and other aberrations are also corrected satisfactorily.

[Embodiment 2]

The basic lens data is shown in Table 3 below. Similar to embodiment 1, the diffraction optics surface DOE is formed on the surface R5 of the third lens L3 on the object side in embodiment 2.

TABLE 3

| Surface No. | R | d | n | v |
|---|---|---|---|---|
| Object surface | ∞ | ∞ | | |
| 1 (diaphragm) | 1.4948 | 0.6921 | 1.53690 | 56.1 |
| 2 | −6.1721 | 0.0348 | | |
| 3 | −6.1900 | 0.3419 | 1.61988 | 25.4 |
| 4 | 4.2069 | 0.6659 | | |
| 5 (DOE) | −2.0009 | 0.9874 | 1.54647 | 55.8 |
| 6 | −0.7591 | 0.1184 | | |
| 7 | −39.0506 | 0.4000 | 1.53690 | 56.1 |
| 8 | 0.9166 | 0.5000 | | |
| 9 | ∞ | 0.3000 | 1.51872 | 64.0 |
| 10 | ∞ | 0.7196 | | |
| Image surface | ∞ | | | | f = 3.945, Fno = 2.4, ω = 36.1°

Next, Table 4 shows the aspheric coefficient and the values of each coefficient of the optical path difference function of the diffraction optics surface in embodiment 2.

TABLE 4

| Aspheric surface data | |
|---|---|
| First surface Aspheric coefficient | Second surface Aspheric coefficient |
| K = −7.0303E+00 | K = 0.0000E+00 |
| A4 = 2.5117E−01 | A4 = 1.9275E−01 |
| A6 = −2.7772E−01 | A6 = −5.9949E−01 |
| A8 = 3.0853E−01 | A8 = 3.2689E−01 |
| A10 = −2.3573E−01 | A10 = 0.0000E+00 |
| Third surface Aspheric coefficient | Fourth surface Aspheric coefficient |
| K = 0.0000E+00 | K = 1.9620E+01 |
| A4 = 2.8087E−01 | A4 = 1.2876E−01 |
| A6 = −5.8181E−01 | A6 = −6.9953E−02 |
| A8 = 2.1322E−01 | A8 = −1.3282E−01 |
| A10 = 1.9234E−01 | A10 = 2.5491E−01 |
| | A12 = −1.2644E−01 |
| Fifth surface Aspheric coefficient | Sixth surface Aspheric coefficient |
| K = 3.6262E+00 | K = −4.1036E+00 |
| A4 = 6.1361E−02 | A4 = −2.1804E−01 |
| A6 = −1.7965E−01 | A6 = 1.8257E−01 |
| A8 = 4.6703E−01 | A8 = −1.5254E−01 |
| A10 = −1.0590E+00 | A10 = 6.0682E−02 |
| A12 = 1.3146E+00 | A12 = −1.7316E−02 |
| A14 = −7.9646E−01 | A14 = 7.0055E−03 |
| A16 = 1.5228E−01 | A16 = −2.7979E−03 |
| Seventh surface Aspheric coefficient | Eighth surface Aspheric coefficient |
| K = 0.0000E+00 | K = −7.9280E+00 |
| A4 = −8.2906E−02 | A4 = −9.3842E−02 |
| A6 = 1.6377E−02 | A6 = 4.1803E−02 |
| A8 = −8.9509E−04 | A8 = −1.6624E−02 |
| A10 = −1.8524E−05 | A10 = 4.3649E−03 |
| | A12 = −7.4908E−04 |

TABLE 4-continued

| Aspheric surface data |
|---|
| A14 = 7.5889E−05 |
| A16 = −3.5520E−06 |
| Fifth surface Coefficient of optical path difference function |
| B2 = −1.0523E+01 |
| B4 = 2.6333E+01 |
| B6 = −1.0578E+01 |
| B8 = −6.6020E+01 |
| B10 = 6.5088E+01 |
| B12 = 5.1134E+01 |
| B14 = −7.4524E+01 |

The values of each condition equations are shown below.

$$f/f_{12} = 0.943 \tag{1}$$

$$f/f_{34} = 0.024 \tag{2}$$

$$f/(V_2 \cdot f_2) + f/(V_d \cdot f_d) = -0.053 \tag{3}$$

$$f/f_d = 0.045 \tag{4}$$

As is apparent, the imaging lens according to embodiment 2 satisfies the condition equations (1) through (4).

Figure 4:
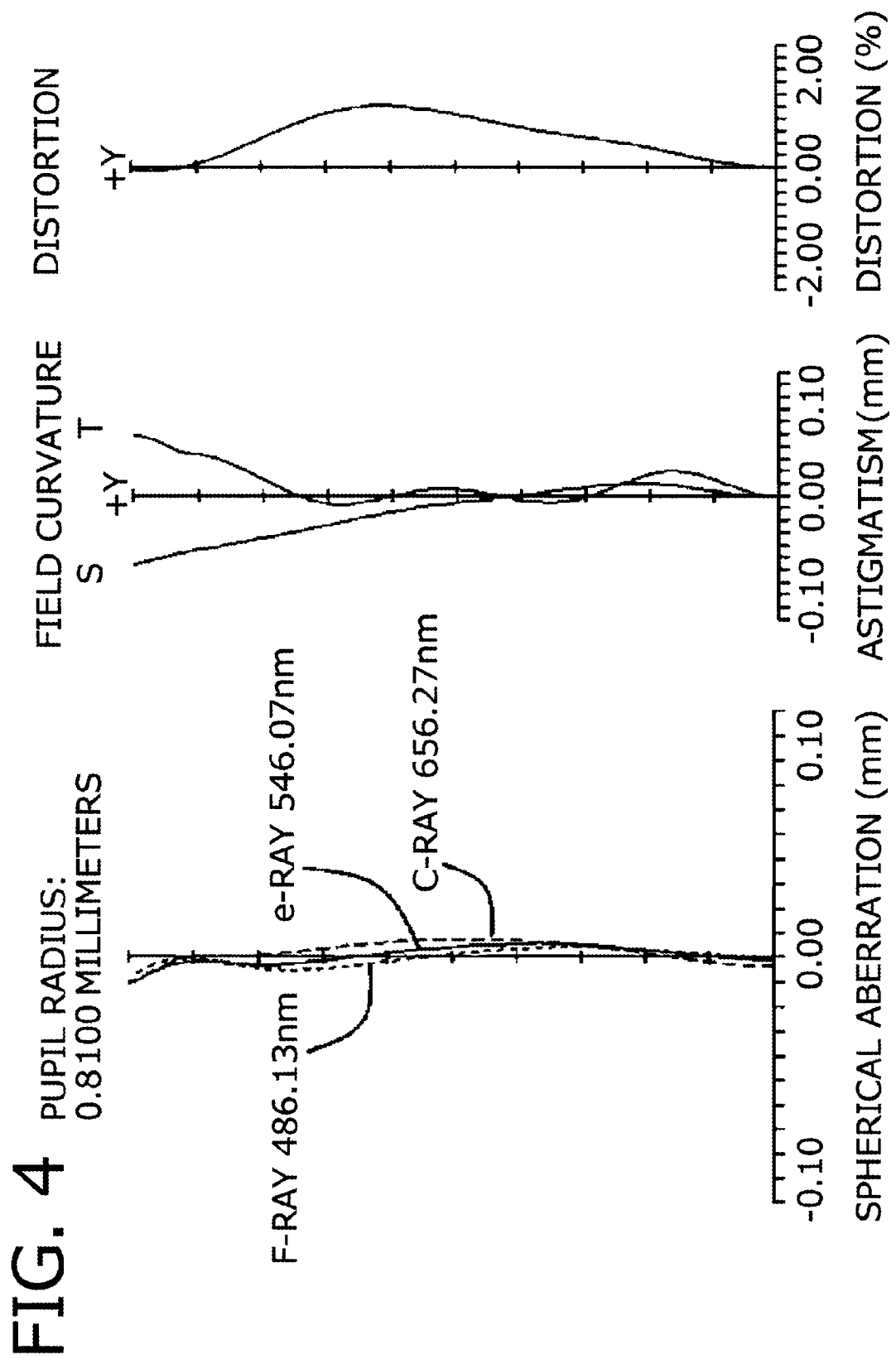
FIG. 4 is an aberration diagram of the imaging lens related to embodiment 2 of the present invention.
Figure 5:
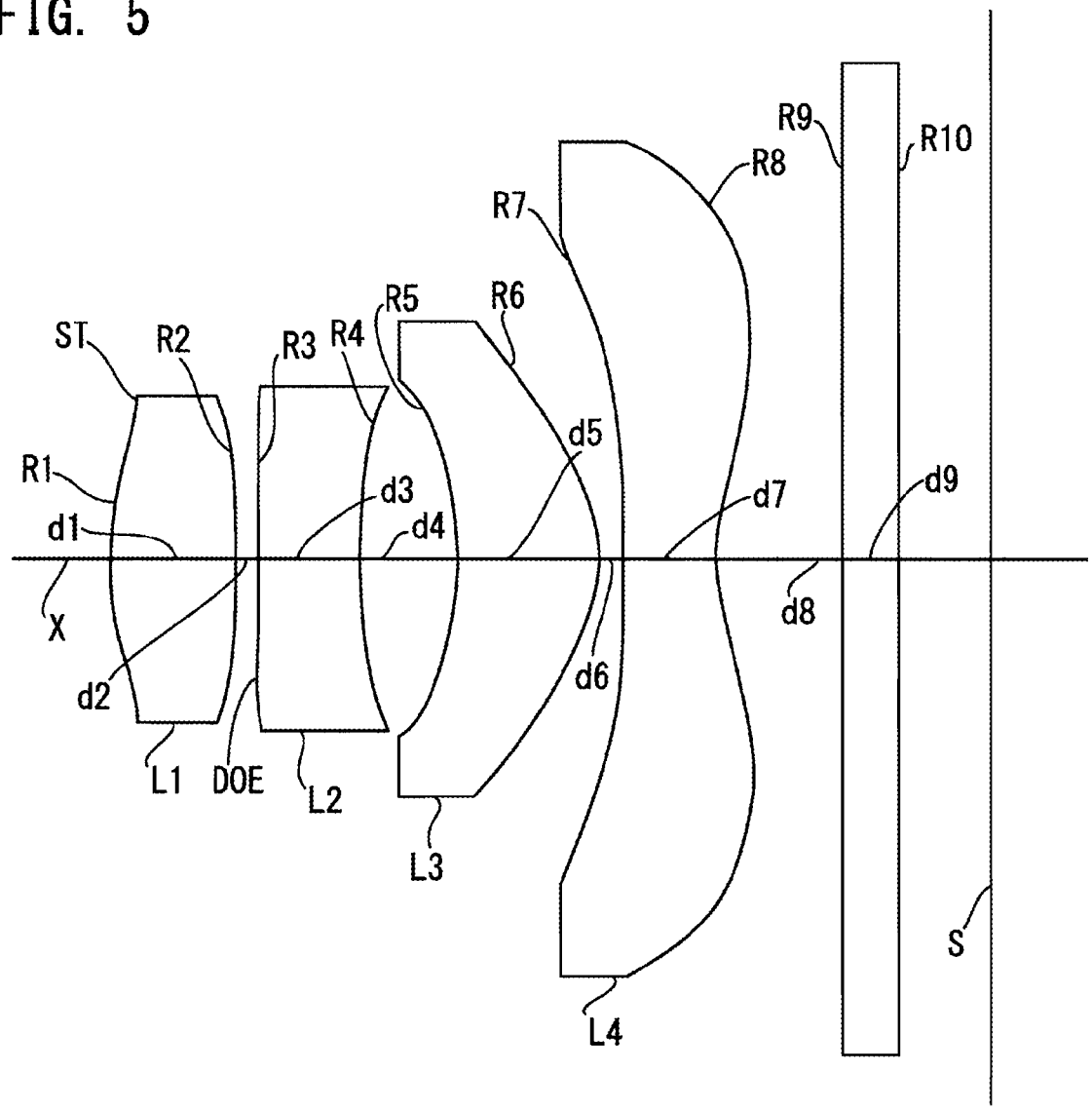
FIG. 5 is a cross-sectional view of the imaging lens related to embodiment 3 of the present invention.

FIG. 4 shows the spherical aberration (mm), astigmatic aberration (mm), and distortion (%) of the imaging lens of embodiment 2. As is shown in FIG. 4, the chromatic aberration is corrected satisfactorily and other aberrations are also corrected satisfactorily, according to the imaging lens related to embodiment 2.

[Embodiment 3]

The basic lens data is shown in Table 5 below. In embodiment 3, the diffraction optics surface DOE is formed on the surface R3 of the second lens L2 on the object side.

TABLE 5

| Surface No. | R | d | n | v |
|---|---|---|---|---|
| Object surface | ∞ | ∞ | | |
| 1(diaphragm) | 1.9890 | 0.6848 | 1.53690 | 56.1 |
| 2 | −6.5000 | 0.1075 | | |
| 3(DOE) | −54.9999 | 0.5506 | 1.61988 | 25.4 |
| 4 | 3.9159 | 0.5259 | | |
| 5 | −2.0910 | 0.7597 | 1.53690 | 56.1 |
| 6 | −0.8465 | 0.1384 | | |
| 7 | −100.0000 | 0.4988 | 1.53690 | 56.1 |
| 8 | 1.0707 | 0.6945 | | |
| 9 | ∞ | 0.3000 | 1.51872 | 64.0 |
| 10 | ∞ | 0.5000 | | |
| Image surface | ∞ | | | | f = 3.918, Fno = 2.4, ω = 36.3°

Next, Table 6 shows the aspheric coefficient and the values of each coefficient of the optical path difference function of the diffraction optics surface in embodiment 3.

TABLE 6

| Aspheric surface data | |
|---|---|
| First surface Aspheric coefficient | Second surface Aspheric coefficient |
| K = 2.0524E+00 | K = 0.0000E+00 |
| A4 = −6.4874E−02 | A4 = −1.2081E−01 |
| A6 = −8.3277E−02 | A6 = 8.0359E−03 |
| A8 = 1.5937E−02 | A8 = 1.0148E−02 |

TABLE 6-continued

Aspheric surface data

| A10 = −5.4916E−02 | A10 = 0.0000E+00 |
|---|---|

| Third surface<br>Aspheric coefficient | Fourth surface<br>Aspheric coefficient |
|---|---|
| K = 0.0000E+00<br>A4 = 1.3197E−02<br>A6 = −1.2069E−01<br>A8 = 2.4509E−01<br>A10 = −8.6673E−02 | K = −3.2492E+01<br>A4 = 1.1258E−01<br>A6 = −5.4110E−02<br>A8 = −1.7442E−04<br>A10 = 5.9917E−02<br>A12 = −1.8474E−02 |

| Fifth surface<br>Aspheric coefficient | Sixth surface<br>Aspheric coefficient |
|---|---|
| K = 3.4878E+00<br>A4 = 7.8833E−02<br>A6 = −1.2240E−01<br>A8 = 3.2610E−01<br>A10 = −7.2611E−01<br>A12 = 1.0216E+00<br>A14 = −8.0528E−01<br>A16 = 2.9082E−01 | K = −4.6595E+00<br>A4 = −2.4079E−01<br>A6 = 2.9356E−01<br>A8 = −2.5053E−01<br>A10 = 1.0805E−01<br>A12 = −1.7426E−02<br>A14 = 2.2176E−03<br>A16 = −5.1649E−04 |

| Seventh surface<br>Aspheric coefficient | Eighth surface<br>Aspheric coefficient |
|---|---|
| K = 0.0000E+00<br>A4 = −9.2532E−02<br>A6 = 2.4021E−02<br>A8 = −1.3061E−03<br>A10 = −9.8701E−05 | K = −8.3811E+00<br>A4 = −9.8562E−02<br>A6 = 4.4249E−02<br>A8 = −1.8586E−02<br>A10 = 5.4307E−03<br>A12 = −1.0595E−03<br>A14 = 1.1940E−04<br>A16 = −5.9905E−06 |

| Third surface<br>Coefficient of optical path<br>difference function |
|---|
| B2 = −2.0145E+01<br>B4 = 7.4910E+01<br>B6 = −2.1483E+02<br>B8 = 4.1655E+02<br>B10 = −5.6855E+02<br>B12 = 4.5007E+02 |

The values of each condition equations are shown below.

$$f/f_{12}=0.927 \quad (1)$$

$$f/f_{34}=-0.029 \quad (2)$$

$$f/(V_2 \cdot f_2)+f/(V_d \cdot f_d)=-0.049 \quad (3)$$

$$f/f_d=0.086 \quad (4)$$

As is apparent, the imaging lens according to embodiment 3 satisfies the condition equations (1) through (4).

Figure 6:
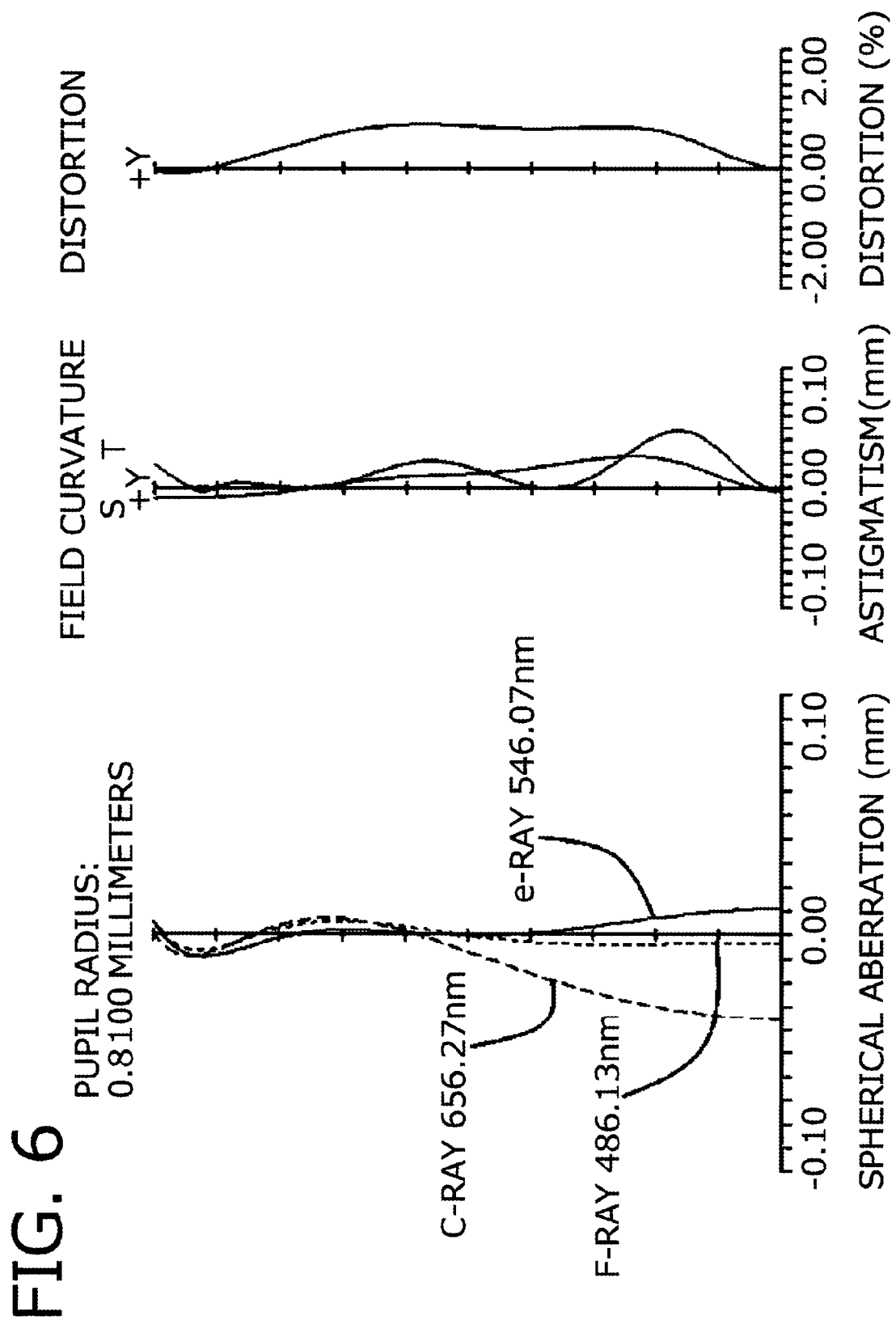
FIG. 6 is an aberration diagram of the imaging lens related to embodiment 3 of the present invention.
Figure 7:
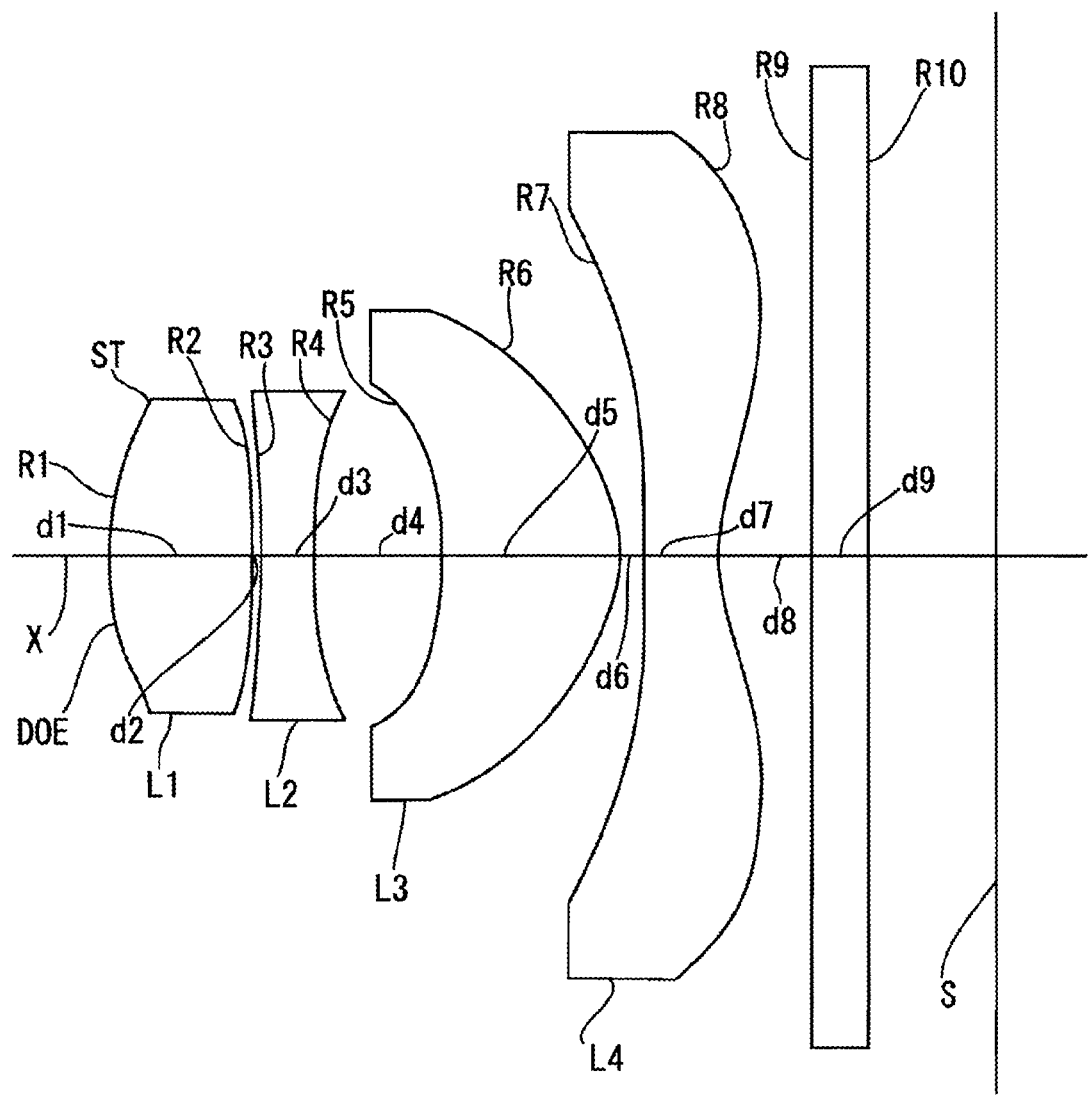
FIG. 7 is a cross-sectional view of the imaging lens related to embodiment 4 of the present invention.

FIG. 6 shows the spherical aberration (mm), astigmatic aberration (mm), and distortion (%) of the imaging lens of embodiment 3. As is shown in FIG. 6, the chromatic aberration is corrected satisfactorily and other aberrations are also corrected satisfactorily according to the imaging lens related to embodiment 3.

[Embodiment 4]

The basic lens data is shown in Table 7 below. In embodiment 4, the diffraction optics surface DOE is formed on the surface R1 of the first lens L1 on the object side.

TABLE 7

| Surface No. | R | d | n | v |
|---|---|---|---|---|
| Object surface | ∞ | ∞ | | |
| 1(diaphragm) (DOE) | 1.4925 | 0.775 | 1.53690 | 56.1 |
| 2 | −5.6022 | 0.040 | | |
| 3 | −5.6025 | 0.285 | 1.61988 | 25.4 |
| 4 | 4.1961 | 0.691 | | |
| 5 | −2.0025 | 0.953 | 1.54647 | 55.8 |
| 6 | −0.7678 | 0.128 | | |
| 7 | −31.7913 | 0.400 | 1.53690 | 56.1 |
| 8 | 0.9400 | 0.500 | | |
| 9 | ∞ | 0.300 | 1.51872 | 64.0 |
| 10 | ∞ | 0.689 | | |
| Image surface | ∞ | | | | f = 4.0038, Fno = 2.43, ω = 35.6°

Next, Table 8 shows the aspheric coefficient and the values of each coefficient of the optical path difference function of the diffraction optics surface in embodiment 4.

TABLE 8

Aspheric surface data

| First surface<br>Aspheric coefficient | Second surface<br>Aspheric coefficient |
|---|---|
| K = −7.5007E+00<br>A4 = 2.4117E−01<br>A6 = −1.9093E−01<br>A8 = 1.4486E−01<br>A10 = −1.1073E−01 | K = 0.0000E+00<br>A4 = 1.6752E−01<br>A6 = −5.4993E−01<br>A8 = 3.1112E−01<br>A10 = 0.0000E+00 |

| Third surface<br>Aspheric coefficient | Fourth surface<br>Aspheric coefficient |
|---|---|
| K = 0.0000E+00<br>A4 = 2.7752E−01<br>A6 = −5.8953E−01<br>A8 = 2.3311E−01<br>A10 = 1.7859E−01 | K = 1.9879E+01<br>A4 = 1.4195E−01<br>A6 = −1.0296E−01<br>A8 = −1.5879E−01<br>A10 = 3.1977E−01<br>A12 = −1.5331E−01 |

| Fifth surface<br>Aspheric coefficient | Sixth surface<br>Aspheric coefficient |
|---|---|
| K = 3.7062E+00<br>A4 = 2.1790E−02<br>A6 = −1.5443E−01<br>A8 = 4.8080E−01<br>A10 = −1.0780E−00<br>A12 = 1.2645E+00<br>A14 = −7.2125E−01<br>A16 = 1.0988E−01 | K = −4.137E+00<br>A4 = −2.2502E−01<br>A6 = 1.9512E−01<br>A8 = −1.6139E−01<br>A10 = 5.9838E−02<br>A12 = −1.3734E−02<br>A14 = 5.8566E−03<br>A16 = −2.8217E−03 |

| Seventh surface<br>Aspheric coefficient | Eighth surface<br>Aspheric coefficient |
|---|---|
| K = 0.0000E+00<br>A4 = −7.2324E−02<br>A6 = 1.7364E−02<br>A8 = −1.0476E−03<br>A10 = −8.7415E−05 | K = −8.1384E+00<br>A4 = −9.0489E−02<br>A6 = 4.1382E−02<br>A8 = −1.6468E−02<br>A10 = 4.3533E−03<br>A12 = −7.4999E−04<br>A14 = 7.5974E−05<br>A16 = −3.5192E−06 |

| First surface<br>Coefficient of optical path<br>difference function |
|---|
| B2 = −5.1907E−01<br>B4 = −3.2503E+01<br>B6 = 1.7225E+02<br>B8 = −4.6461E+02<br>B10 = 7.6971E+02<br>B12 = −7.4711E+02<br>B14 = 3.2145E+02 |

The values of each condition equations are shown below.

$f/f_{12}=0.964$ (1)

$f/f_{34}=-0.023$ (2)

$f/(V_2 \cdot f_2)+f/(V_d \cdot f_d)=-0.042$ (3)

$f/f_d=0.002$ (4)

As is apparent, the imaging lens according to embodiment 4 satisfies the condition equations (1) through (4).

Figure 8:
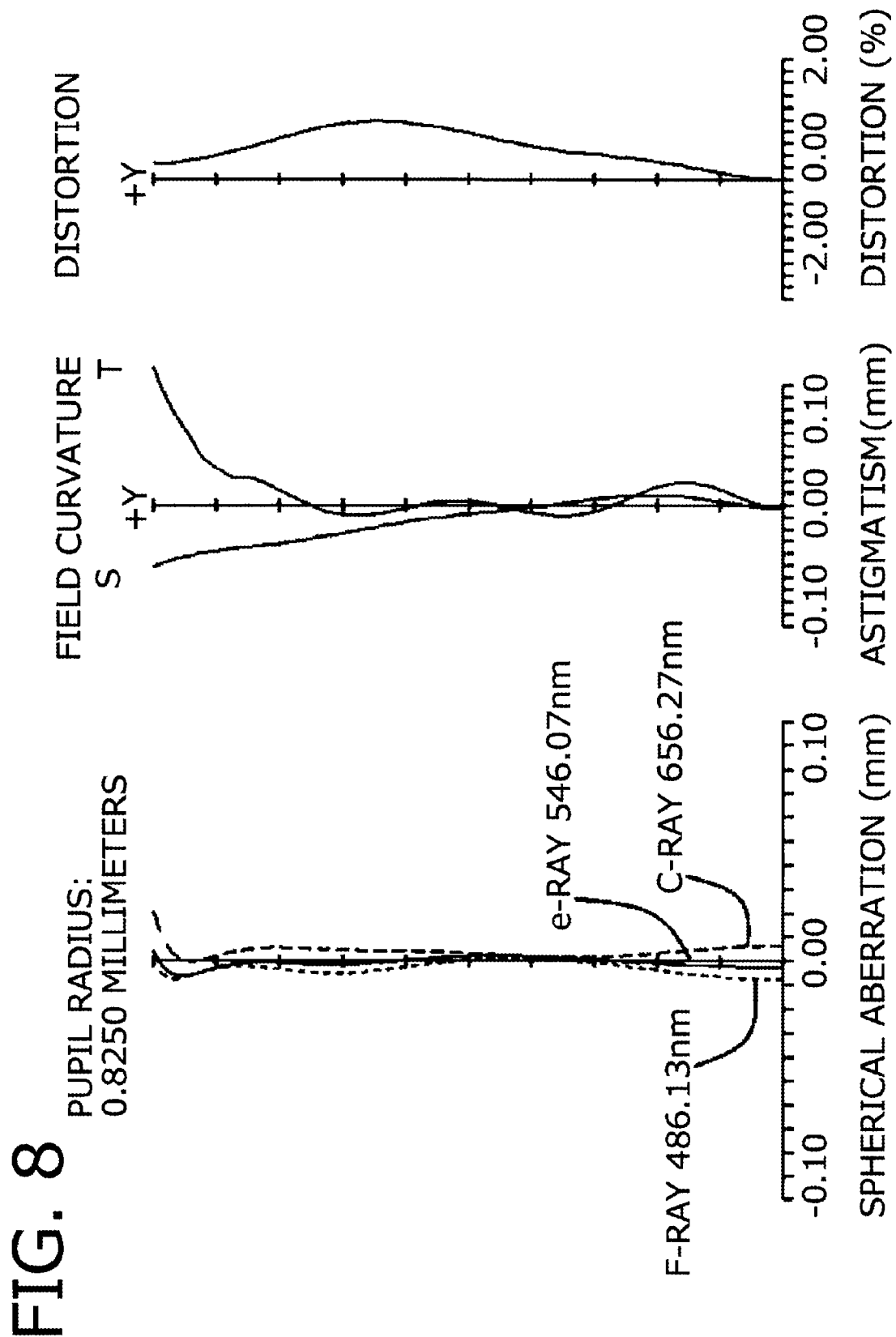
FIG. 8 is an aberration diagram of the imaging lens related to embodiment 4 of the present invention.
Figure 9:
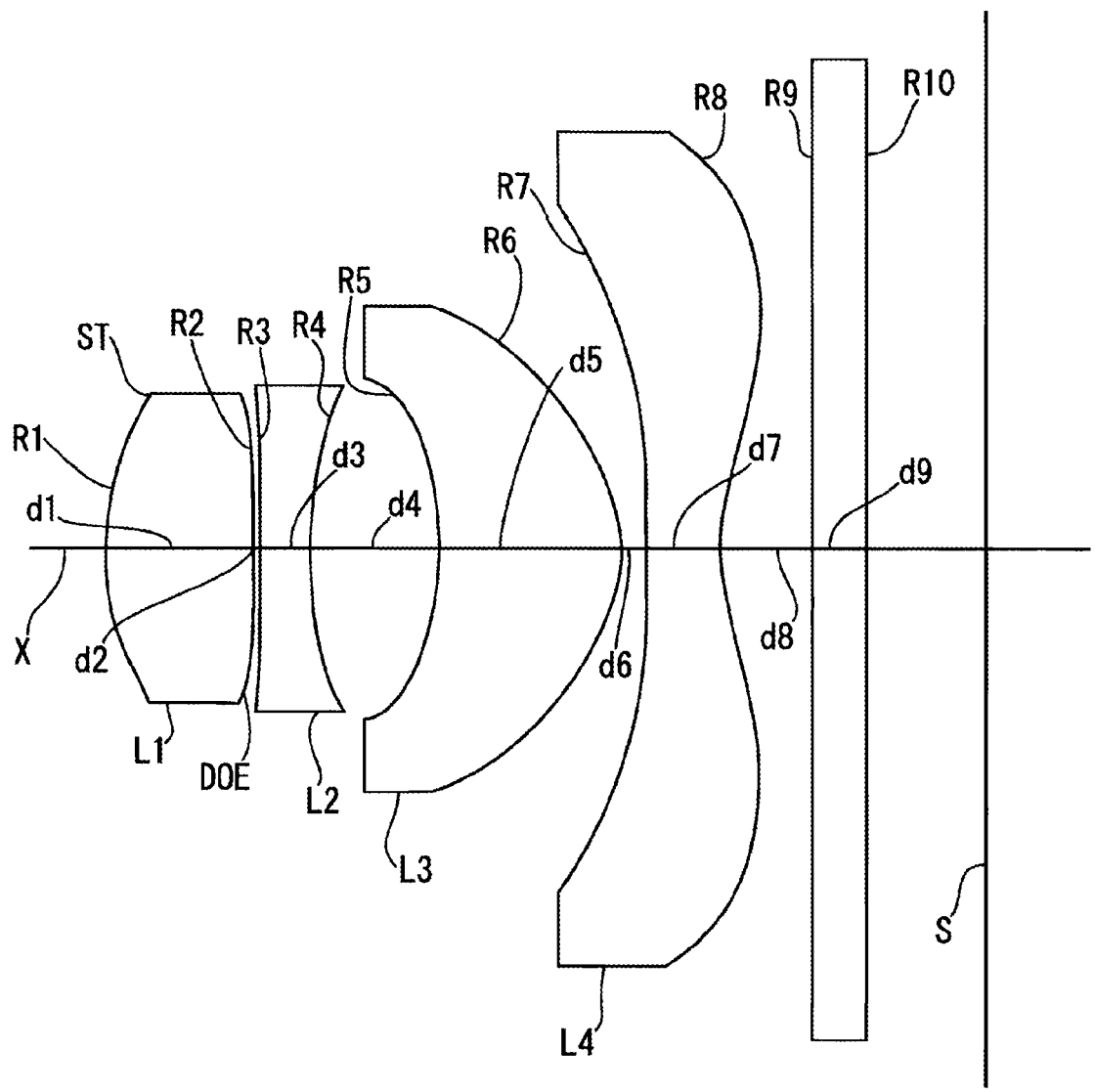
FIG. 9 is a cross-sectional view of the imaging lens related to embodiment 5 of the present invention.

FIG. 8 shows the spherical aberration (mm), astigmatic aberration (mm), and distortion (%) of the imaging lens of embodiment 4. As is shown in FIG. 8, the chromatic aberration is corrected satisfactorily and other aberrations are also corrected satisfactorily according to the imaging lens related to embodiment 4.

[Embodiment 5]

The basic lens data is shown in Table 9 below. In embodiment 5, the diffraction optics surface DOE is formed on the surface R2 of the first lens L1 on the image side.

TABLE 9

| Surface No. | R | d | n | v |
|---|---|---|---|---|
| Object surface | ∞ | ∞ | | |
| 1(diaphragm) | 1.5044 | 0.798 | 1.53690 | 56.1 |
| 2 (DOE) | −7.9825 | 0.031 | | |
| 3 | −7.9875 | 0.280 | 1.61988 | 25.4 |
| 4 | 4.1953 | 0.686 | | |
| 5 | −2.0035 | 0.977 | 1.54647 | 55.8 |
| 6 | −0.7733 | 0.136 | | |
| 7 | −31.0000 | 0.400 | 1.53690 | 56.1 |
| 8 | 0.9400 | 0.500 | | |
| 9 | ∞ | 0.3000 | 1.51872 | 64.0 |
| 10 | ∞ | 0.6519 | | |
| Image surface | ∞ | | | | f = 3.9688, Fno = 2.42, ω = 35.7°

Next, Table 10 shows the aspheric coefficient and the values of each coefficient of the optical path difference function of the diffraction optics surface in embodiment 5.

TABLE 10

| Aspheric surface data | |
|---|---|
| First surface Aspheric coefficient | Second surface Aspheric coefficient |
| K = −7.220E+00<br>A4 = 2.5014E−01<br>A6 = −2.5686E−01<br>A8 = 2.5366E−01<br>A10 = −1.5652E−01 | K = 0.0000E+00<br>A4 = 1.8105E−01<br>A6 = −6.1122E−01<br>A8 = 3.7020E−01<br>A10 = 0.0000E+00 |
| Third surface Aspheric coefficient | Fourth surface Aspheric coefficient |
| K = 0.000E+00<br>A4 = 2.7406E−01<br>A6 = −5.8995E−01<br>A8 = 2.6967E−01<br>A10 = 1.2870E−01 | K = 1.194E+01<br>A4 = 1.3975E−01<br>A6 = −7.9377E−02<br>A8 = −1.5110E−01<br>A10 = 2.6156E−01<br>A12 = −1.0700E−01 |
| Fifth surface Aspheric coefficient | Sixth surface Aspheric coefficient |
| K = 3.649E+00<br>A4 = 3.1194E−02<br>A6 = −1.7408E−01<br>A8 = 4.8526E−01<br>A10 = −1.0457E−00 | K = −4.156E+00<br>A4 = −2.2163E−01<br>A6 = 1.8537E−01<br>A8 = −1.5569E−01<br>A10 = 6.0484E−02 |

TABLE 10-continued

| Aspheric surface data | |
|---|---|
| A12 = 1.2845E+00<br>A14 = −8.5823E−01<br>A16 = 2.1404E−01 | A12 = −1.5824E−02<br>A14 = 6.4525E−03<br>A16 = −2.8673E−03 |
| Seventh surface Aspheric coefficient | Eighth surface Aspheric coefficient |
| K = 0.0000E+00<br>A4 = −7.8722E−02<br>A6 = 1.6958E−02<br>A8 = −9.8380E−04<br>A10 = −6.4359E−05 | K = −8.1127E+00<br>A4 = −9.1716E−02<br>A6 = 4.1523E−02<br>A8 = −1.6510E−02<br>A10 = 4.3549E−03<br>A12 = −7.4995E−04<br>A14 = 7.5897E−05<br>A16 = −3.5367E−06 |
| Second surface Coefficient of optical path difference function | |
| B2 = −5.0628E+00<br>B4 = −1.1574E+01<br>B6 = 2.1335E+01<br>B8 = 4.1075E+01<br>B10 = −5.9100E+01<br>B12 = −4.3161E+01<br>B14 = 4.8212E+01 | |

The values of each condition equations are shown below.

$f/f_{12}=0.971$ (1)

$f/f_{34}=-0.039$ (2)

$f/(V_2 \cdot f_2)+f/(V_d \cdot f_d)=-0.042$ (3)

$f/f_d=0.022$ (4)

As is apparent, the imaging lens according to embodiment 5 satisfies the condition equations (1) through (4).

Figure 10:
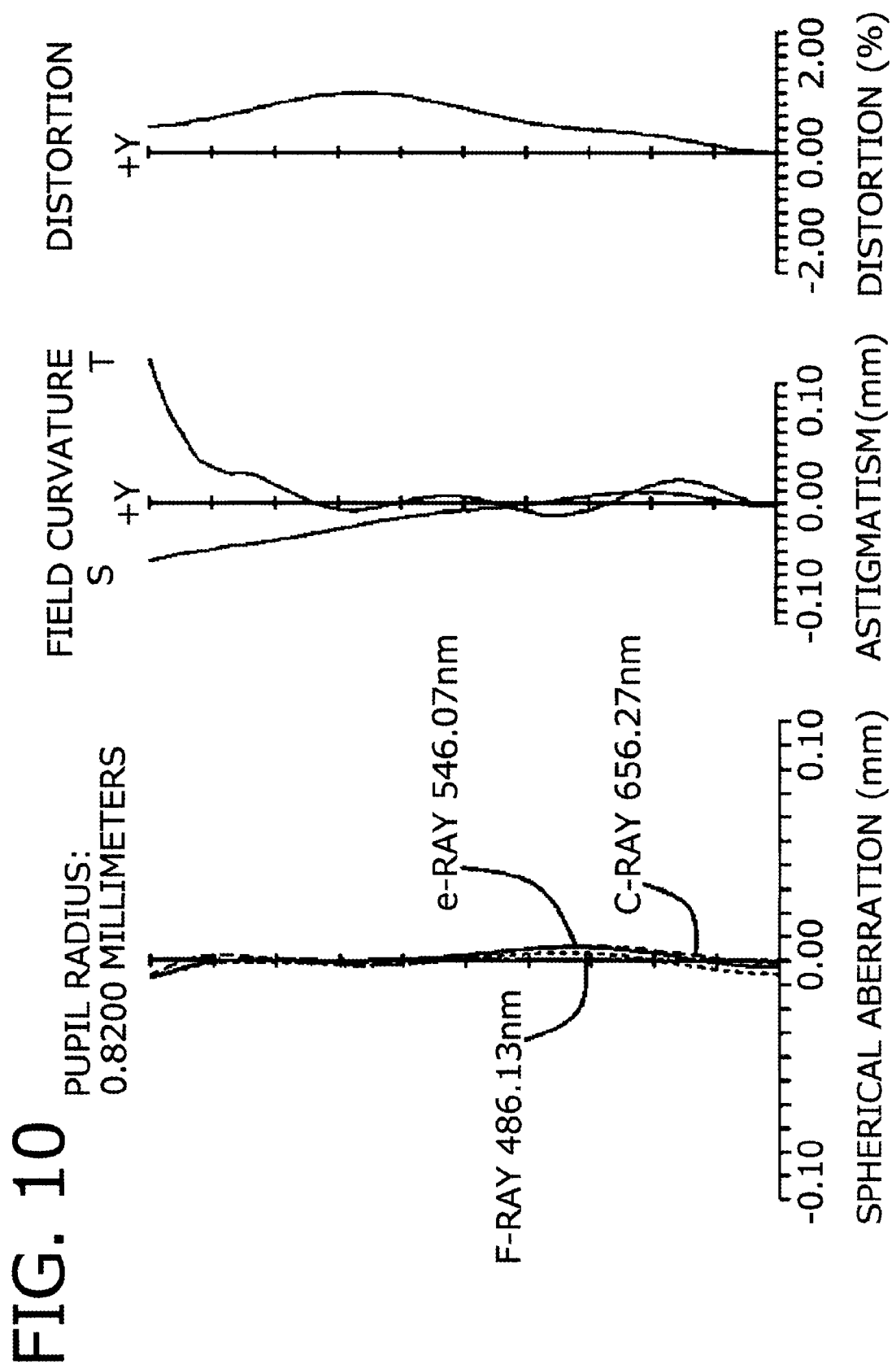
FIG. 10 is an aberration diagram of the imaging lens related to embodiment 5 of the present invention.
Figure 11:
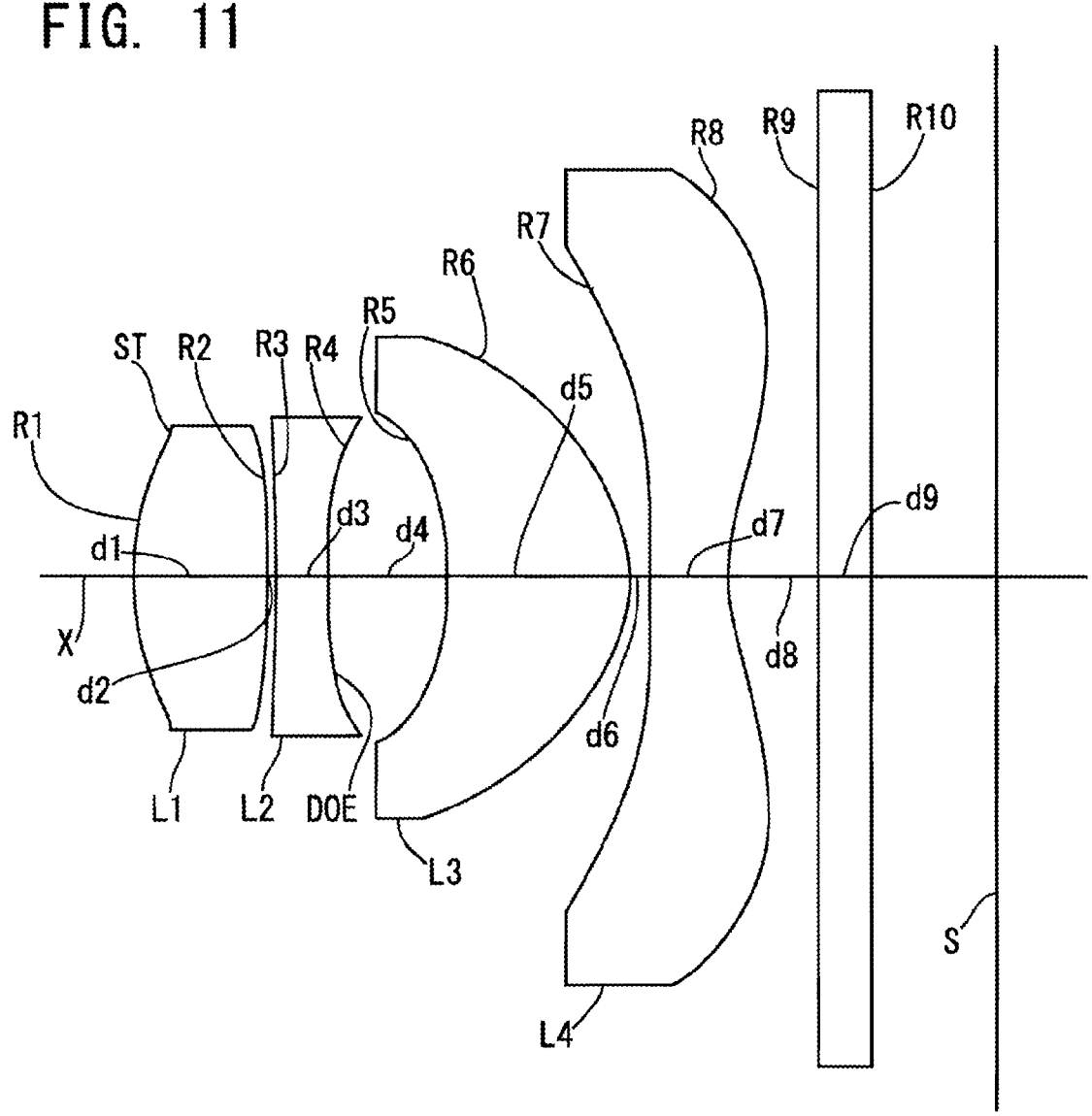
FIG. 11 is a cross-sectional view of the imaging lens related to embodiment 6 of the present invention.

FIG. 10 shows the spherical aberration (mm), astigmatic aberration (mm), and distortion (%) of the imaging lens of embodiment 5. As is shown in FIG. 10, the chromatic aberration is corrected satisfactorily and other aberrations are also corrected satisfactorily according to the imaging lens related to embodiment 5.

[Embodiment 6]

The basic lens data is shown in Table 11 below. In embodiment 6, the diffraction optics surface DOE is formed on the surface R4 of the second lens L2 on the image side.

TABLE 11

| Surface No. | R | d | n | v |
|---|---|---|---|---|
| Object surface | ∞ | ∞ | | |
| 1(diaphragm) | 1.5205 | 0.744 | 1.53690 | 56.1 |
| 2 | −7.3061 | 0.045 | | |
| 3 | −7.5446 | 0.286 | 1.61988 | 25.4 |
| 4 (DOE) | 4.1953 | 0.656 | | |
| 5 | −1.9661 | 1.007 | 1.54647 | 55.8 |
| 6 | −0.7573 | 0.114 | | |
| 7 | −31.0000 | 0.428 | 1.53690 | 56.1 |
| 8 | 0.9400 | 0.500 | | |
| 9 | ∞ | 0.300 | 1.51872 | 64.0 |
| 10 | ∞ | 0.682 | | |
| Image surface | ∞ | | | | f = 3.9688, Fno = 2.42, ω = 35.7°

Next, Table 12 shows the aspheric coefficient and the values of each coefficient of the optical path difference function of the diffraction optics surface in embodiment 6.

TABLE 12

| Aspheric surface data | |
|---|---|
| First surface Aspheric coefficient | Second surface Aspheric coefficient |
| K = −6.449E+00<br>A4 = 2.1576E−01<br>A6 = −2.1363E−01<br>A8 = 2.1643E−01<br>A10 = −1.6939E−01 | K = 0.0000E+00<br>A4 = 1.4206E−01<br>A6 = −5.1154E−01<br>A8 = 2.8033E−01<br>A10 = 0.0000E+00 |
| Third surface Aspheric coefficient | Fourth surface Aspheric coefficient |
| K = 0.000E+00<br>A4 = 2.7767E−01<br>A6 = −5.6928E−01<br>A8 = 2.2350E−01<br>A10 = 1.6959E−01 | K = 2.0315E+01<br>A4 = 1.4555E−01<br>A6 = −8.6526E−02<br>A8 = −1.6825E−01<br>A10 = 2.7010E−01<br>A12 = −1.0075E−01 |
| Fifth surface Aspheric coefficient | Sixth surface Aspheric coefficient |
| K = 3.6102E+00<br>A4 = 1.7099E−02<br>A6 = −1.4541E−01<br>A8 = 4.4299E−01<br>A10 = −1.0330E+00<br>A12 = 1.3234E+00<br>A14 = −9.2125E−01<br>A16 = 2.4692E−01 | K = −3.9244E+00<br>A4 = −2.3269E−01<br>A6 = 1.8443E−01<br>A8 = −1.5309E−01<br>A10 = 5.9511E−02<br>A12 = −1.6706E−02<br>A14 = 6.8568E−03<br>A16 = −2.9959E−03 |
| Seventh surface Aspheric coefficient | Eighth surface Aspheric coefficient |
| K = 0.0000E+00<br>A4 = −8.3684E−02<br>A6 = 1.8519E−02<br>A8 = −9.5099E−04<br>A10 = −1.0510E−04 | K = −7.9816E+00<br>A4 = −9.2381E−02<br>A6 = 4.1382E−02<br>A8 = −1.6502E−02<br>A10 = 4.3575E−03<br>A12 = −7.5006E−04<br>A14 = 7.5871E−05<br>A16 = −3.5406E−06 |
| Fourth surface Coefficient of optical path difference function | |
| B2 = −1.0701E+00<br>B4 = 1.6179E+01<br>B6 = −1.5805E+01<br>B8 = −1.8663E+01<br>B10 = 4.6932E+01<br>B12 = 4.9851E+01<br>B14 = −1.1826E+02 | |

The values of each condition equations are shown below.

$$f/f_{12}=0.953 \quad (1)$$

$$f/f_{34}=-0.024 \quad (2)$$

$$f/(V_2 \cdot f_2)+f/(V_d \cdot f_d)=-0.047 \quad (3)$$

$$f/f_d=0.045 \quad (4)$$

As is apparent, the imaging lens according to embodiment 6 satisfies the condition equations (1) through (4).

Figure 12:
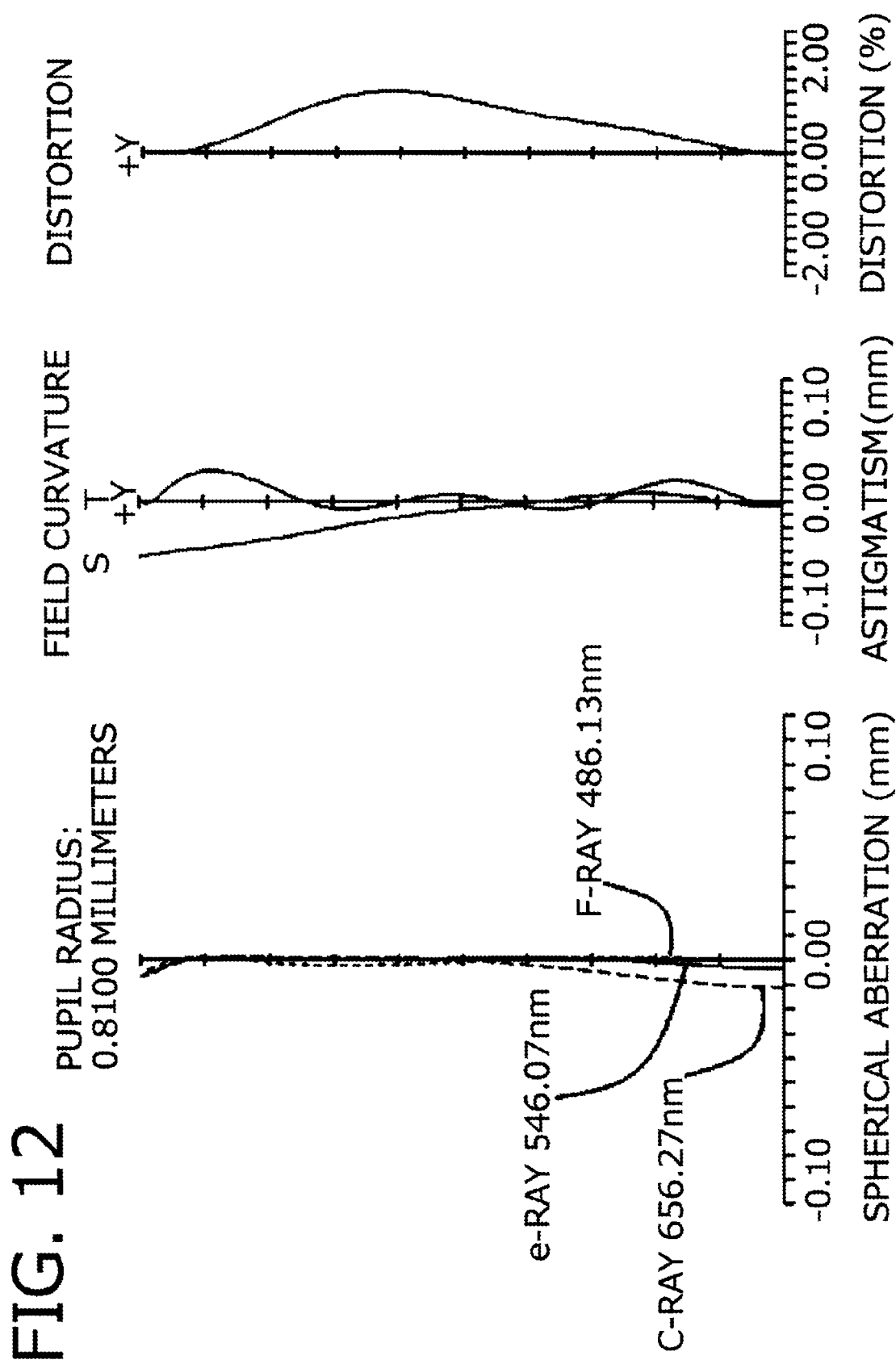
FIG. 12 is an aberration diagram of the imaging lens related to embodiment 6 of the present invention.

FIG. 12 shows the spherical aberration (mm), astigmatic aberration (mm), and distortion (%) of the imaging lens of embodiment 6. As is shown in FIG. 12, the chromatic aberration is corrected satisfactorily and other aberrations are also corrected satisfactorily according to the imaging lens related to embodiment 6.

Therefore, the imaging lens according to the embodiments mentioned above is capable of balancing the chromatic aberration correction and other aberration correction with a small number of lens configuration, and realizing larger aperture ratio and higher performance.

INDUSTRIAL APPLICABILITY

The present invention is capable of being applied to small-sized imaging elements having increased pixels, and is especially effective in the field of small-sized imaging lens mounted on personal digital assistants such as cellular phones.

The effects of the present invention are as follows.

According to the present invention, by arranging the diffraction optics surface at the optimum position in the imaging lens of a four-lens configuration, it becomes possible to provide the small-sized and high-performance imaging lens in which the chromatic aberration is corrected satisfactorily than in the conventional lens, and in which balance with other aberration corrections is realized.

Further, by using plastic material to every lens, it becomes possible to reduce costs.

What is claimed is:

1. An imaging lens for an imaging element, comprising:
   a first lens, a second lens, a third lens, and a fourth lens arranged in the named order from an object side, wherein both surfaces of each lens are formed of aspheric surfaces, a diffraction optics surface exerting chromatic aberration correction function is arranged on any one surface from a surface of the first lens on an object side to a surface of the third lens on the object side, and each lens is configured from plastic material.

2. The imaging lens according to claim 1,
   wherein the first lens is a biconvex lens,
   the second lens is a biconcave lens,
   the third lens is a meniscus lens having a positive refractive power with a concave surface facing the object side,
   the fourth lens is a biconcave lens, and
   the aperture diaphragm is arranged on the surface of the first lens on the object side.

3. The imaging lens according to claim 1,
   satisfying following condition equations:

$$0.83 < f/f_{12} < 1.04 \quad (1)$$

$$-0.05 < f/f_{34} < 0.08 \quad (2)$$

$$-0.07 < f/(V_2 \cdot f_2) + f/(V_d \cdot f_d) < -0.03 \quad (3)$$

$$-0.01 < f/f_d < 0.15 \quad (4)$$

where
f: focal length of overall optical system
$f_{12}$: composite focal length of the first lens and the second lens
$f_{34}$: composite focal length of the third lens and the fourth lens
$f_2$: focal length of the second lens
$f_d$: focal length of the diffraction optics surface
$V_2$: Abbe number of e-ray of the second lens
$V_d$: Abbe number of e-ray of the diffraction optics surface.

4. The imaging lens according to claim 2,
   satisfying following condition equations:

$$0.83 < f/f_{12} < 1.04 \quad (1)$$

$$-0.05 < f/f_{34} < 0.08 \quad (2)$$

$$-0.07 < f/(V_2 \cdot f_2) + f/(V_d \cdot f_d) < -0.03 \quad (3)$$

$$-0.01 < f/f_d < 0.15 \quad (4)$$

where f: focal length of overall optical system $f_{12}$: composite focal length of the first lens and the second lens $f_{34}$: composite focal length of the third lens and the fourth lens $f_2$: focal length of the second lens $f_d$: focal length of the diffraction optics surface $V_2$: Abbe number of e-ray of the second lens $V_d$: Abbe number of e-ray of the diffraction optics surface.

* * * * *